United States Patent [19]
Atlas

[11] Patent Number: 6,097,533
[45] Date of Patent: Aug. 1, 2000

[54] OPTICAL AMPLIFIER FOR CATV SYSTEM WITH FORWARD AND REVERSE PATHS

[75] Inventor: Dogan A. Atlas, Duluth, Ga.

[73] Assignee: Antec Corporation, Duluth, Ga.

[21] Appl. No.: 08/955,311

[22] Filed: Oct. 21, 1997

[51] Int. Cl.[7] ............................. H01S 3/00; H04S 14/02; H04B 9/00
[52] U.S. Cl. ..................... 359/337; 359/160; 359/179; 359/341
[58] Field of Search ...................... 359/337, 341, 359/124, 127, 179, 134, 160

[56] References Cited

U.S. PATENT DOCUMENTS

| | | | |
|---|---|---|---|
| 5,293,547 | 3/1994 | Gysel et al. . | |
| 5,452,124 | 9/1995 | Baker . | |
| 5,548,438 | 8/1996 | Delavaux . | |
| 5,563,732 | 10/1996 | Erdogan et al. . | |
| 5,563,733 | 10/1996 | Mitsuda et al. . | |
| 5,572,357 | 11/1996 | Nakazato et al. . | |
| 5,633,741 | 5/1997 | Giles | 359/124 |
| 5,689,595 | 11/1997 | Pan | 385/27 |
| 5,742,416 | 4/1998 | Mizrahi | 359/134 |
| 5,748,363 | 5/1998 | Duch et al. | 359/341 |
| 5,812,306 | 9/1998 | Mizrahi | 359/341 |

FOREIGN PATENT DOCUMENTS 6-188494  7/1994  Japan .

OTHER PUBLICATIONS

Van de Plaats et al, OFC '95, Conf on Opt. Fiber Commun., vol. 8, pp. (438) 64–5. abstract only herewith, Mar. 3, 1995.

*Primary Examiner*—Nelson Moskowitz

[57] ABSTRACT

A system for amplifying separate optical signals traveling in a forward path and a reverse path over an optical communications system used for CATV program distribution. A first and second optical circulator, each having a first, second, and third port, are connected to respective opposite sides of a bi-directional amplifier. The first port of the first circulator inputs a first optical signal traveling in the forward path. The second port of the first circulator is coupled to an input/output port of the amplifier. The third port of the first circulator outputs an amplified second signal traveling in the reverse path. The second circulator is similarly connected to the side of the amplifier. A first and second signal/signal WDM coupler, each having a pass port P, an add port A/D, and a common port C, are coupled to the first and second optical circulators, respectively. The first port of the first optical circulator is connected to the pass port of the first signal/signal WDM coupler, and the third port of the first optical circulator is connected to the add port of the first signal/signal WDM coupler. The common port of the first signal/signal WDM coupler outputs an amplified second path signal and inputs a first path signal. The second signal/signal WDM coupler is similarly connected to the second optical circulator and outputs an amplified first path signal and inputs a second path signal. In this manner, the present invention provides bi-directional amplification of signals traveling in opposite paths on a single fiber communications link.

19 Claims, 10 Drawing Sheets

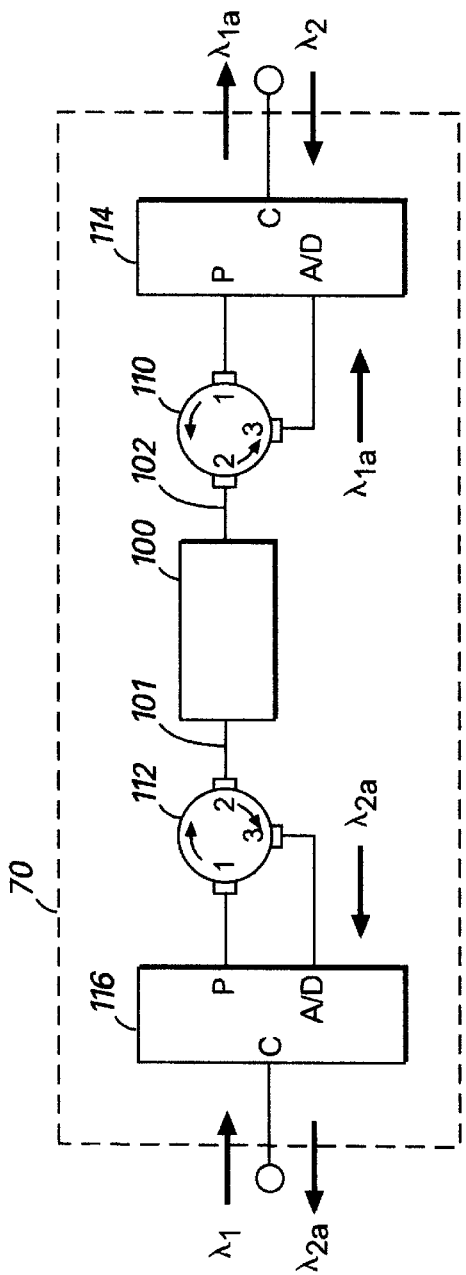
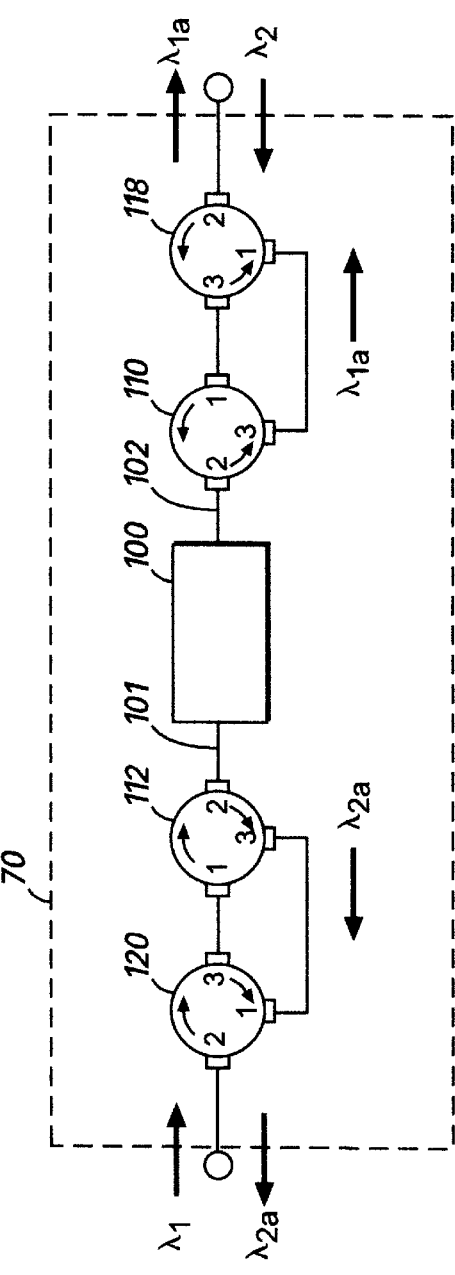
FIG.14A
FIG.14B

OPTICAL AMPLIFIER FOR CATV SYSTEM WITH FORWARD AND REVERSE PATHS

FIELD OF THE INVENTION

This invention relates generally to the amplification of optical signals, and is more particularly directed to a system for the bi-directional amplification of linearly modulated optical signals of a CATV system with forward and reverse paths.

BACKGROUND OF THE INVENTION

Conventional subscriber systems, such as CATV systems, are typically arranged to provide a variety of services including video, data, audio, and telephony. The services available to the subscribers of a particular system are most often provided from a national network source and transmitted to the headend of the system over a satellite link. An integrated receiver-detector (IRD) located at the headend downlinks the services and additional headend equipment combines the satellite services with any local or terrestrial services into a broadband signal for transportation over the CATV distribution network.

There are many network architectures used in CATV systems for the delivery of the broadband signal to the subscribers. In the past, a common network architecture was a tree and branch structure having one or more coaxial cable trunks which covered the subscriber area. From each trunk, numerous coaxial cable feeders were then run to subscribers in smaller localities. Because optical fiber cable can carry more CATV services with less loss over greater distances than coaxial cable, many CATV systems are upgrading their coaxial cable plant with fiber optic cable. One popular modern architecture of a CATV system which uses optical fiber cable is termed a "star" configuration because it utilizes many optical fibers carrying the broadband signal from a central point to a plurality of local service areas or nodes. At each node, the broadband signal is converted back to a radio frequency (RF) broadband signal and distributed to subscribers via a series of coaxial cable feeders.

Generally, these CATV systems have been deployed as single point to multipoint broadcast type systems. Present-day CATV systems typically use a forward or downstream path over which the broadband video signal is broadcast, and a reverse or upstream path over which information may be returned to the headend. The upstream path is generally used for interactive data from the subscribers or for network control, billing, maintenance, and authorization functions. Interactive data can include data concerning a subscriber's instructions for ordering a product, feedback about on-screen information such as for interactive gaming or polling, a subscriber telephony or data signal directed to a person inside or outside the network, or the like. Thus the downstream broadband signal and the upstream signal for a CATV system are distinctly different from each other.

In the star architecture using fiber optic cable as the transmission medium to a series of nodes, one fiber can be utilized for the forward path and another fiber can be utilized for the reverse path. Current CATV architectures employ 1550-nm or 1310-nm wavelength optical signal beams to transport broadband video signals downstream using the forward path fiber. Interactive data and telephony traffic is transported upstream using 1310-nm wavelength optical signal beams over the reverse path fiber. Commercial high power optical amplifiers have made it possible to transport broadband video signals through forward path optical fibers which are deployed deeper, close to the subscriber's premises using 1550-nm wavelength lasers. Due to longer forward path fiber runs, reverse path optical fiber distances have proportionally increased. Therefore, upstream transmission of data, telephony, and video signals using 1310-nm wavelength lasers can be adversely affected because of additional attenuation over the longer reverse path fiber. An alternative for transporting upstream traffic is the use of 1550-nm wavelength laser sources where optical amplifiers can be employed to compensate for the excess loss in the reverse path fiber.

The use of separate downstream and upstream fibers also necessitates the use of additional optical amplifiers, which adds system expense. More systems are beginning to eliminate the necessity for a separate upstream fiber cable from each node by using optical multiplexing techniques to combine the downstream signal and upstream signal on a single fiber. However, because most optical amplifiers are unidirectional, there is still the additional expense of dual active components for the system.

Therefore, there is a need in the art for a bi-directional optical amplifier for CATV systems that can accommodate both forward and reverse path traffic. There is also a need for a bi-directional optical amplifier capable of transmitting, receiving, and regenerating in both the forward and reverse paths for a star or ring architecture having a dual fiber optical cable configuration or for a single fiber system. Further, it would be of advantage if such a bi-directional optical amplifier could take into account the different characteristics and parameters between the forward path signal and the reverse path signal.

SUMMARY OF THE INVENTION

The present invention provides a system for amplifying separate optical signals traveling in a forward path and a reverse path over an optical communications system used for CATV program distribution. Advantageous implementations are provided for a headend interface amplifier, a regeneration amplifier, and a node interface amplifier. In addition, bi-directional optical amplifiers are provided for single or dual optical fiber systems.

In accordance with an embodiment of the present invention, a first and second optical circulator, each having a first, second, and third port, are connected to respective opposite sides of a bi-directional amplifier. The first port of the first circulator inputs a first set of optical signal beams traveling in the forward path. The second port of the first circulator is coupled to an input/output port of the amplifier. The third port of the first circulator outputs an amplified second set of optical signal beams traveling in the reverse path. Similarly, the first port of the second circulator inputs the second optical signal traveling in the reverse path. The second port of the second circulator is coupled to the other input/output port of the amplifier. The third port of the second circulator outputs the amplified first set of optical signal beams traveling in the forward path. Thus, the present invention provides amplification of forward and reverse path signals in a dual fiber CATV communications system.

Another embodiment of the present invention includes two signal/signal WDM couplers each having a pass port P, an add (or drop) port A/D, and a common port C. The first and second signal/signal WDM couplers are coupled to the first and second optical circulators, respectively. The first port of the first optical circulator is connected to the pass port of the first signal/signal WDM coupler, and the third port of the first optical circulator is connected to the add port of the first signal/signal WDM coupler. The common port of the first signal/signal WDM coupler outputs an amplified second path signal and inputs a first path signal. Similarly, the first port of the second optical circulator is connected to the pass port of the second signal/signal WDM coupler, and the third port of the second optical circulator is connected to the add port of the second signal/signal WDM coupler. The common port of the second signal/signal WDM coupler outputs an amplified first path signals and inputs a second path signals. In this manner, the present invention provides bi-directional amplification of signals traveling in opposite paths on a single fiber communications link.

The present invention also provides a method for the transmission of broadcast and narrowcast services in a system having a headend, a hub connected the headend, and a plurality of nodes connected to the hub. Instead of transmitting the signals directly from the headend to each node, the signals are transmitted from the headend to the hub. The signals transmitted from the headend to the hub include both broadcast services to be transmitted to each node and narrowcast services to be transmitted only to predetermined targeted nodes. The broadcast and narrowcast services are transmitted by optical signal beams operating at different wavelengths. Subscribers can transmit signals to the headend, via each node, on the reverse channel. The reverse channel information from subscribers is combined at each respective node into a single wavelength for each node. The present invention adds the narrowcast services at the headend instead of at the hub. By adding the narrowcast services at the headend, the processing of the narrowcast signals is performed by the electronic processing equipment at the headend. Therefore, the narrowcast signals leave the headend as optical signals, and the hub is only required to perform optical signal processing, and is not required to have any electrical processing equipment. In this manner, the hub performs only optical signal processing, which reduces the complexity and cost of the system.

BRIEF DESCRIPTION OF THE DRAWINGS

FIG. 14A is a detailed schematic diagram of a first implementation of the optical amplifier illustrated in FIG. 9.

FIG. 14B is a detailed schematic diagram of a second implementation of the optical amplifier illustrated in FIG. 9.

DETAILED DESCRIPTION OF THE PREFERRED EMBODIMENTS

Figure 1A:
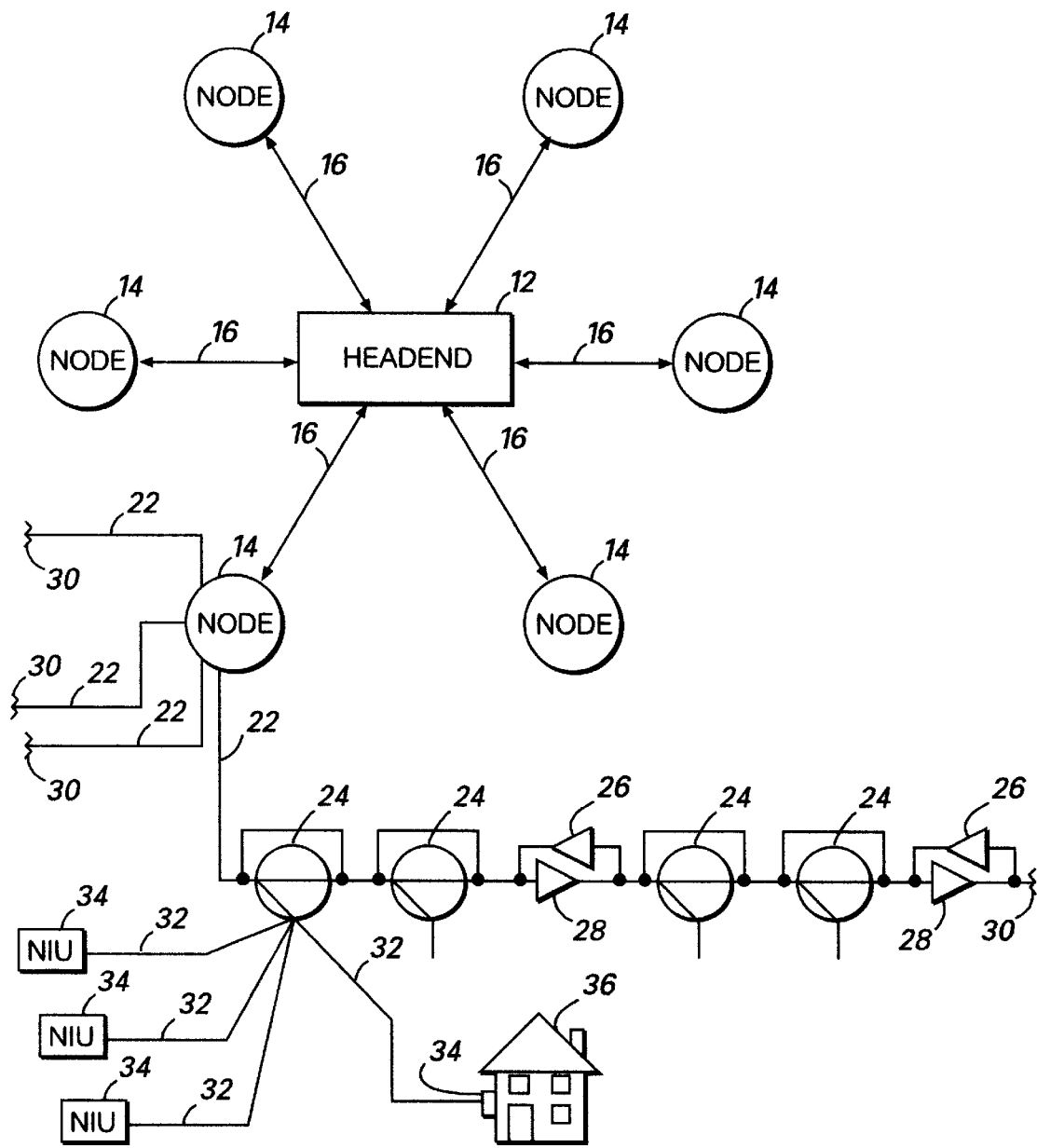
FIG. 1A is a system schematic diagram of a typical hybrid fiber/coaxial (HF/C) communications system for a conventional CATV system.

Referring now in detail to the drawings, FIG. 1A shows the network operating elements of a typical subscriber communications or CATV system 10 having a star type hybrid fiber/coaxial (HF/C) architecture. A headend 12 is the originating point for a broadband information signal which is broadcast to a multiplicity of subscribers 36. Signal sources input to the headend 12 include over-the-air stations, satellite services, and terrestrial services, such as by microwave relay. In addition, local programming services may also originate at the headend 12. These services may include analog video, digital video, voice (telephony), data services, or the like. All of the source signals are processed and then combined at the headend 12 into an RF broadband signal for broadcast or transmission over a distribution network.

In an HF/C system, the RF broadband information signal is converted into light by a modulation process before being broadcast. The modulation is an amplitude modulation onto a light source, usually a laser source, for transmission on optical communications links 16 comprising optical fiber cable. The headend 12 feeds the optical broadband information signal through the plurality of optical communications links 16 to a plurality of nodes 14. In a typical system, each fiber communications link 16 feeds an associated optical node 14 with the optical broadband information signal. The nodes 14 are arranged in a star architecture to provide coverage of convenient geographic areas.

The optical broadband information signal is detected by a conventional optical receiver at each node 14 and converted back into an RF broadband information signal to be provided to a plurality of coaxial feeder cables 22 emanating from the node 14. Each feeder cable 22 terminates at termination block 30 and includes a number of broadband signal taps 24 and a lesser number of bi-directional line extender amplifiers 26 and 28. The taps 24 and amplifiers 26 and 28 are serially interposed along sections of the feeder cable 22 between the node 14 and a termination block 30. Each broadband signal tap 24 draws a small portion of the broadband information signal transmitted through feeder cable 22 and delivers it to a subscriber 36, such as a home or business. Typically, there are hundreds and sometimes thousands of subscribers supported by each distribution node 14. The broadband signal taps 24 are connected to the subscriber equipment, such as a network interface unit (NIU) 34, using a subscriber drop cable 32.

Subscribers are able to transmit a return information signal back toward the headend 12 over a reverse channel by using an RF modulator. Generally, a narrow band, digitally modulated, asynchronous signal is transmitted from each subscriber via the drop cable 32 and feeder cable 22 toward the node 14. The reverse path line extender amplifiers 26 amplify these signals in the upstream direction where they are collected for all the subscribers transmitting on a particular feeder 22. All return information signals from each feeder 22 for a node 14 are combined at the node and converted into an optical return information signal for transmission over the optical communications link 16 to the headend 12.

Figure 1B:
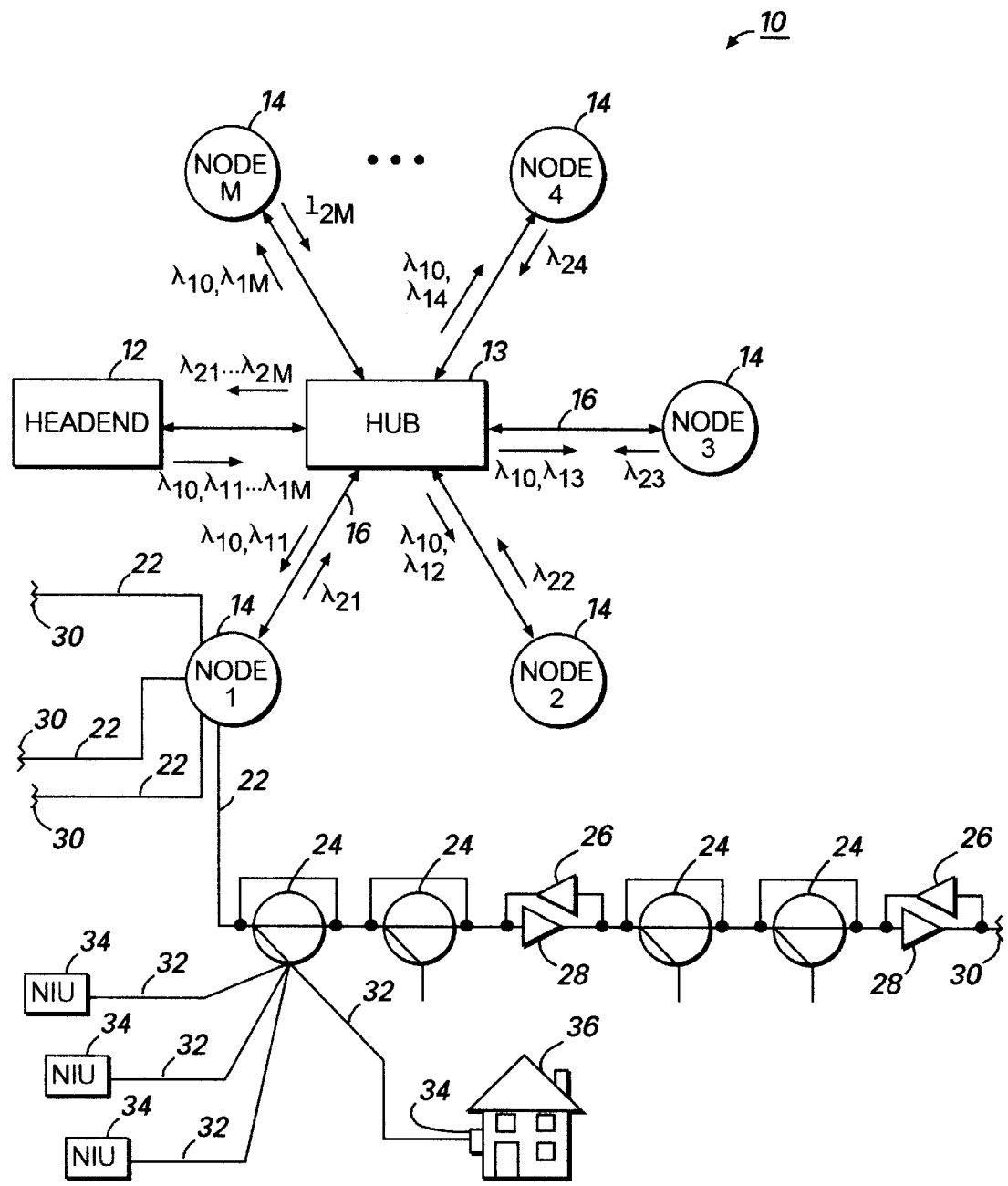
FIG. 1B is a system schematic diagram of a WDM HF/C communications system in accordance with the present invention.
Figure 2:
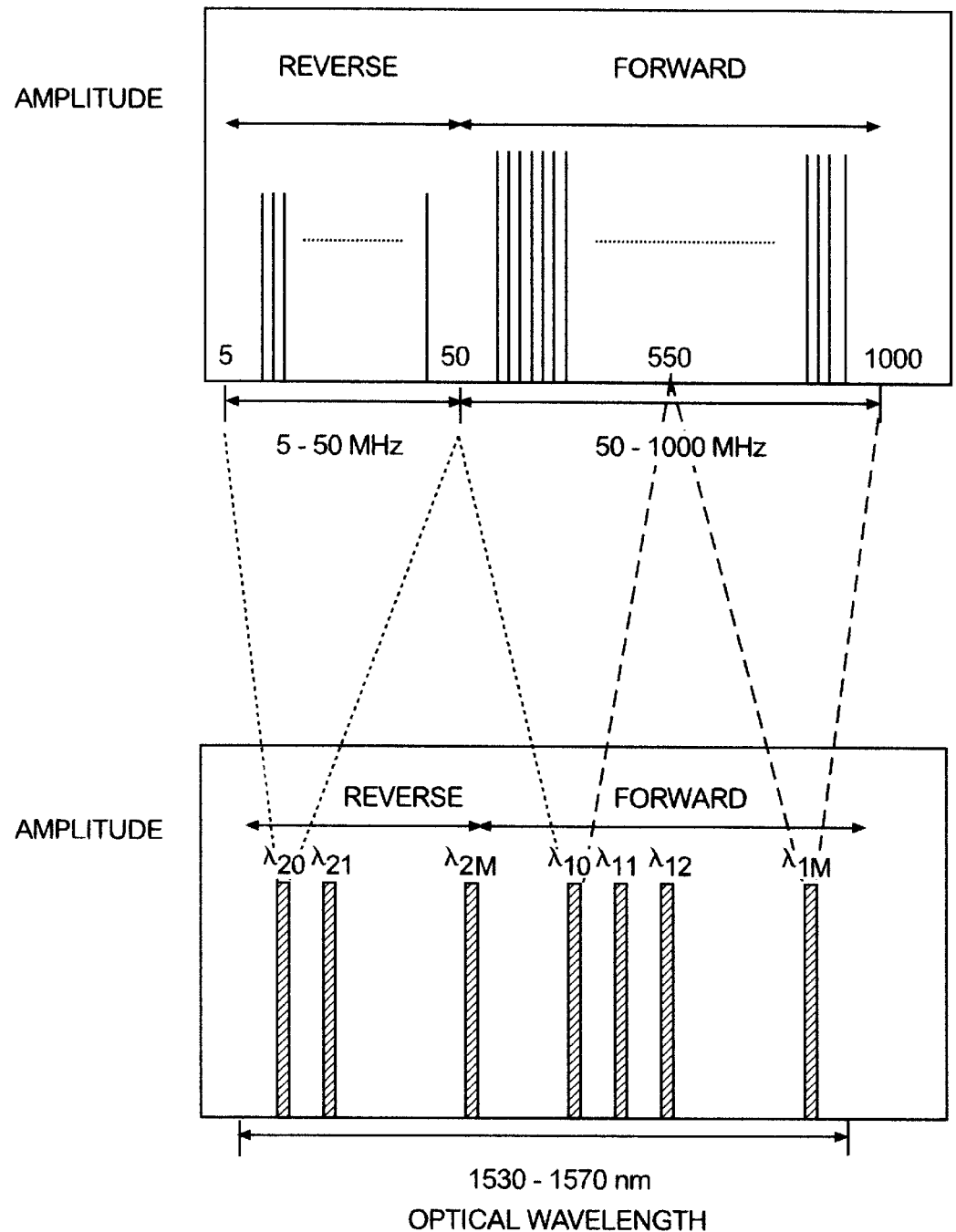
FIG. 2 is a pictorial representation of the optical wavelength allocation and RF signal configuration in the forward and reverse path optical beams of the HF/C communications system illustrated in FIG. 1B.

FIG. 2 pictorially represents the bandwidth allocation and general configuration of the forward and reverse signals for the communication systems illustrated in FIGS. 1A and 1B. The downstream or forward signal generally receives the largest portion of system bandwidth allocation because it carries the information services to the subscribers 36. In many typical CATV systems, the downstream channel includes a bandwidth from 50 MHz–550 MHz in older systems and from 50 MHz–750 MHz in newer systems. There is considerable pressure on the downstream channel to carry even more information and recent CATV systems have expanded the forward channel capacity from 50 MHz–1000 MHz. The downstream broadband information signal is typically a frequency division multiplex of 6 MHz channels. One major component of the multiplex is video programming channels having baseband NTSC formatted video programs amplitude modulated onto a carrier. Other services can also be provided including data and telephony with the analog or digital modulation formats. The data, telephony and digital video channels are placed from 550 MHz–1000 MHz. These services are known as targeted or "narrowcast" services.

The upstream or reverse channel comprises a broadband signal which is a frequency division multiplex of a plurality of carriers. The reverse channels including AM modulated (QPR, QPSK, nQAM, etc.) channels are of differing bandwidths. Digitally modulated channels are presently being used for a variety of digital services including broadband telephony and data services including one way and interactive services. The upstream channel typically comprises a frequency division multiplex of carriers modulated with the channels in the frequency range of 5 MHz–50 MHz. These upstream channels are generally of lesser bandwidth than the downstream channels, on the order of 50–100 kHz, and many times are digitally modulated and have a different modulation depth and index.

The upstream channels are generally of lesser bandwidth because they return information from individual subscribers and thus carry lower information loads than the downstream channels and may not be used all of the time. Typically the upstream channels are used to communicate an individual subscriber's telephony signal, and requests for data, or services back to the headend. Therefore, the optical communications links 16 are bi-directional communications paths that provide for the transmission of an optical broadband information signal from the headend 12 to the node 14 in a forward path and for the transmission of an optical return information signal from the node 14 to the headend in a reverse path.

Two basic types of services channels are provided by the communications system. One channel is a "broadcast" services channel, which consists of those services that are transmitted to all nodes. The other type of services channel is a "narrowcast" services channel, which is provided, or targeted, only to a particular node or nodes, but is not necessarily provided to all nodes.

As will be understood by those skilled in the art, each node serves different subscribers. Typically, each node serves a different geographic region within the communications system. The different areas served by the different nodes may include subscribers having different demographic characteristics. The different regions served by the different nodes, therefore, may include subscribers that desire different communications services. For example, subscribers in a region having a large Hispanic population may wish to be provided with programming in the Spanish language. Thus, the communications system may provide Spanish-language programming as a narrowcast service channel such that the Spanish programming is provided to subscribers in that particular node but is not provided to subscribers in another node that serves a much smaller Hispanic population. Therefore, each node may have its own set of narrowcast services channels.

FIG. 1B shows a communications system used for the transmission of broadcast and narrowcast services channels in accordance with the present invention. The system of FIG. 1B includes a headend 12 and a hub 13. The hub feeds optical information signals through a plurality of communications links 16 to a plurality of nodes 14. In FIG. 1B, the plurality of nodes have been identified as node 1, node 2, node 3, node 4, . . . , node M.

The headend transmits all of the signals to be transmitted to the nodes. Instead of transmitting the signals directly from the headend to each node, the signals are transmitted from the headend to the hub. The signals transmitted from the headend to the hub include both the broadcast services channels and the narrowcast services channels. The broadcast and narrowcast services channels are transmitted by optical signal beams operating at wavelengths chosen from the forward set of wavelengths $\lambda_{10}, \lambda_{11}, \lambda_{12}, \lambda_{13}, \lambda_{14}, \ldots, \lambda_{1M}$, as shown in FIG. 2. The broadcast services channel is transmitted by an optical signal beam operating, for example, at wavelength $\lambda_{10}$. The broadcast channel wavelength is distributed from the hub to all M nodes. The remaining optical signal beams operating at wavelengths $\lambda_{11}, \lambda_{12}, \lambda_{13}, \lambda_{14}, \ldots, \lambda_{1M}$ are narrowcast services channels targeted at nodes 1, 2, 3, 4, . . . , M, respectively. Individual targeted optical signal beams at different wavelengths may carry the same or different programming. Thus the narrowcast services channels, identified as wavelengths $\lambda_{11}, \lambda_{12}, \lambda_{13}, \lambda_{14}, \ldots, \lambda_{1M}$, are transmitted on the forward channel from the hub to node 1, node 2, node 3, node 4, . . . , node M, respectively. It will be understood that the broadcast signal $\lambda_{10}$ is transmitted on the forward channel from the headend to the hub, and then distributed from the hub to each node. It will also be understood that all narrowcast services channels are transmitted on the forward channel from the headend to the hub, but that the hub processes such narrowcast channels and transmits only those narrowcast channels designated for each node. Subscribers can transmit signals to the headend, via each node, on the reverse channel. Preferably, the broadcast and narrowcast signals are carried by their respective wavelengths to their respective nodes by a single fiber.

These reverse channel signals are designated as $\lambda_{21}$, $\lambda_{22}$, $\lambda_{23}$, $\lambda_{24}$, . . . , $\lambda_{2M}$, for each respective node. The reverse channel information from subscribers is combined at each respective node into a single wavelength for each node, such as $\lambda_{21}$ for node 1, $\lambda_{22}$ for node 2, and so forth for each node. As shown in FIG. 2, each wavelength in the forward waveband are optical carriers for the forward broadband signal and each wavelength in the reverse waveband are optical carriers for the reverse signal. The broadcast wavelength $\lambda_{10}$ consists of broadcast services channels having frequencies preferably, for example, from 50 MHz to 550 MHz. The narrowcast wavelengths $\lambda_{11}$, $\lambda_{12}$, $\lambda_{13}$, $\lambda_{14}$, . . . , $\lambda_{1M}$, consist of narrowcast services channels having frequencies preferably from 550 MHz to 1000 MHz. Preferably, the reverse channel signals are carried from each node to the hub for processing on the same broadcast/narrowcast fiber or on a dedicated second fiber.

In prior systems, the narrowcast services were inserted at the hub. Adding the narrowcast services channels at the hub required that certain electronic equipment be provided at the hub for processing the RF narrowcast services and converting them from electrical signals to optical signals for transmission over optical fiber to the nodes. Also, prior implementations that added narrowcast signals at the hub rather than the headend transmitted the narrowcast services to each node over a separate optical fiber, thereby increasing the system's complexity and cost.

The present invention adds the narrowcast services channels at the headend instead of at the hub. By adding the narrowcast services channels at the headend, the processing of the narrowcast signals is performed by the electronic processing equipment at the headend. Therefore, the narrowcast signals leave the headend as optical signals, and the hub is not required to have any electrical processing equipment. In this manner, the hub is not required to have equipment for processing electrical signals, but is only required to have optical processing equipment for processing the optical signals to and from the headend, which reduces the complexity and cost of the system.

Figure 3:
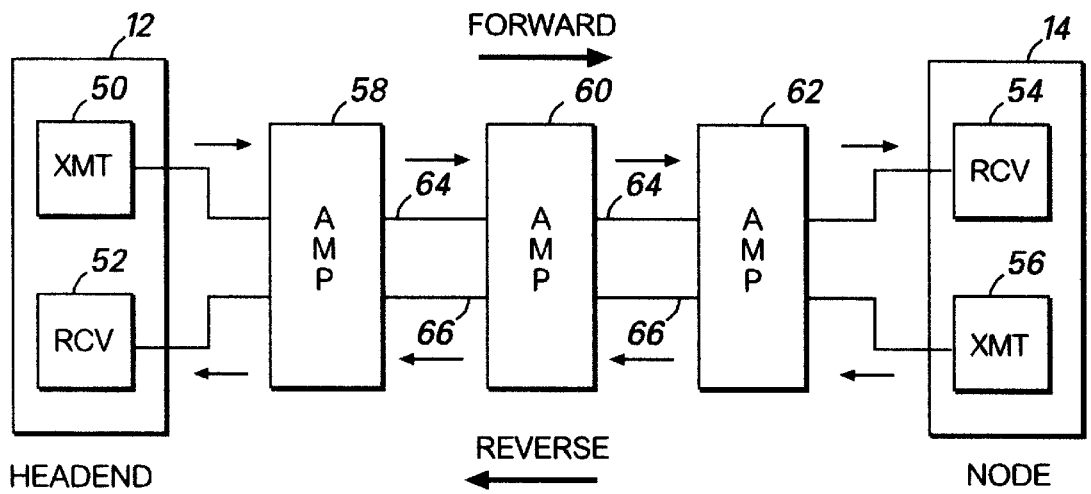
FIG. 3 is a schematic block diagram of an optical communications link using a dual fiber transmission architecture between the headend and a node of the system illustrated in FIG. 1B.

FIG. 3 illustrates a block diagram of a dual fiber architecture for an optical communication link 16. At the headend 12 of the optical communication link 16 is an optical transmitter 50 which generates an optical signal modulated with the broadband information signal. The modulation can be intensity or phase modulation and the source laser can radiate at a number of different wavelengths. Preferably the optical transmitter externally phase modulates a 1550-nm laser source with the broadband information signal. The resulting optical information signal is optically coupled to the input of the forward stage of an optical headend interface amplifier 58. The signal is optically amplified and propagated in the forward direction over a separate optical fiber link 64. The optical information signal is then regenerated by the forward stage of an optical regenerator amplifier 60 before being propagated in the forward direction to an optical node interface amplifier 62 over another part of the fiber link 64. The output of the forward stage of the node interface amplifier 62 is detected and demodulated by an optical receiver 54 at node 14 and converted back into an RF information signal for distribution over the coaxial cable part of the network.

Similarly, an optical transmitter 56 at node 14 converts the return information signal into a modulated optical return signal. The transmitter 56 can be the same or different than transmitter 50. The transmitters 50 and 56 can transmit on the same frequency or different wavelengths, usually between 1530–1570-nm. This signal is optically amplified by, and transmitted through, the return stages of the node interface amplifier 62, the regenerator amplifier 60, and the headend interface amplifier 58 via separate optical fiber links 66.

Figure 4:
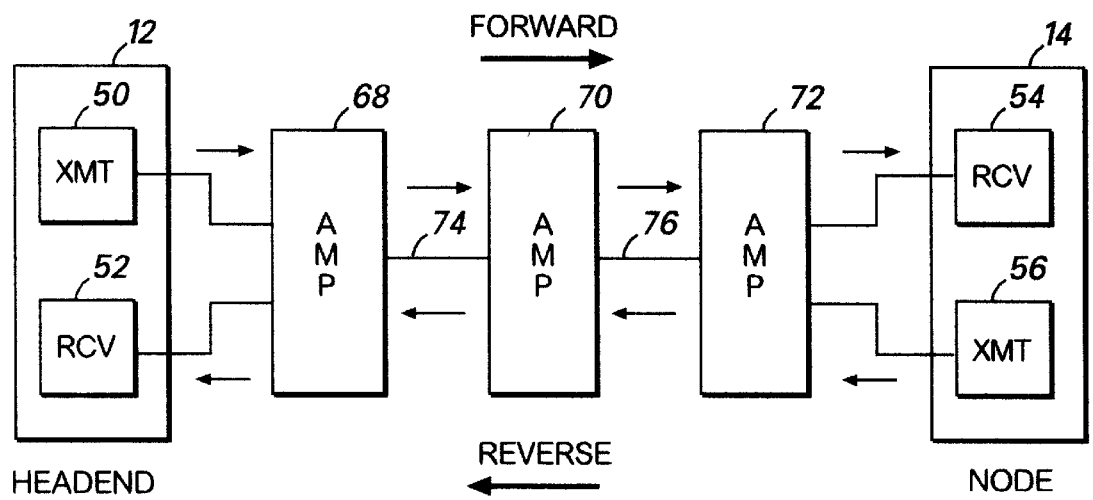
FIG. 4 is a schematic block diagram of an optical communication link using a single fiber transmission architecture between the headend and a node of the system illustrated in FIG. 1B.

FIG. 4 illustrates an optical link 16 where the dual fiber links have been replaced by single optical fibers 74 and 76. The fibers 74 and 76 carry both the forward and reverse optical signals between a headend interface amplifier 68 and a node interface amplifier 72. They are regenerated by one or more regeneration optical amplifiers 70. The headend interface amplifier 68 splits the two signals on its input side and combines the two signals on its output side. Conversely, nodal interface amplifier 72 combines the two signals on its input side and splits the two signals on its output side. Thus, both amplifier 68 and amplifier 72 are three port devices. Amplifier 70 combines the two signals on both sides and is, therefore, a two port device.

Figure 5:
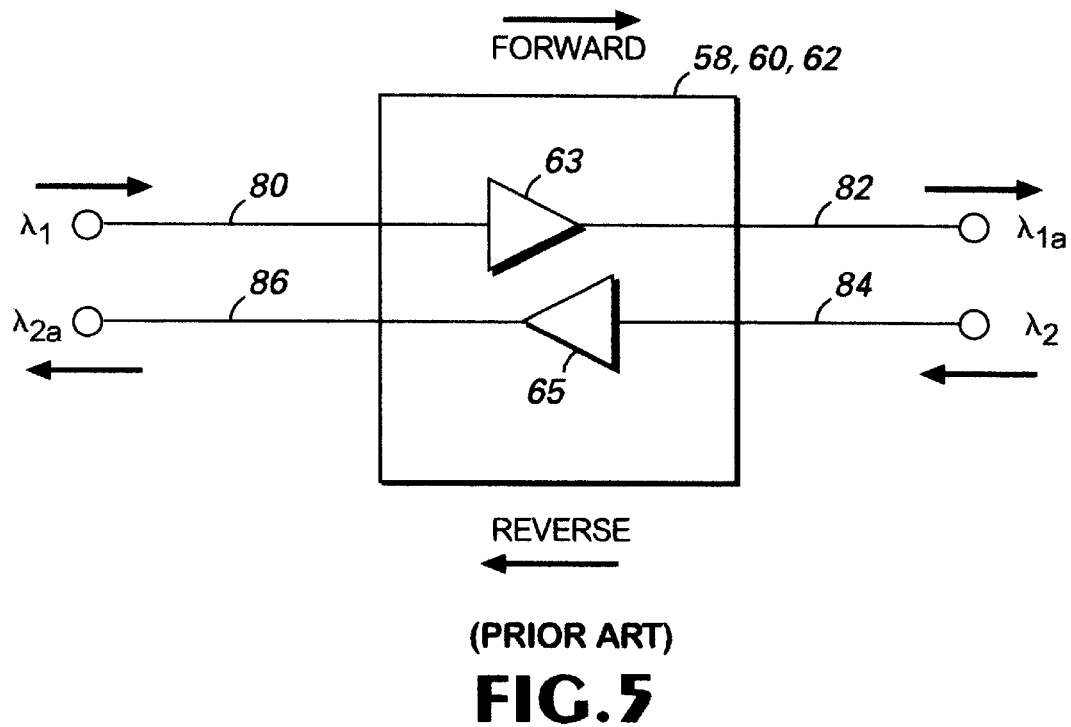
FIG. 5 is a schematic block diagram of two optical amplifiers which are utilized in a simple form for a headend interface amplifier, a regeneration amplifier, and a nodal interface amplifier in the optical communication link illustrated in FIG. 3.

Prior implementations of optical communications link 16 utilized a set of amplifiers in the forward direction and a separate set of amplifiers in the reverse direction, each feeding separate optical fiber links 64 and 66, as shown in FIG. 3. FIG. 5 is an example showing how each amplifier 58, 60, and 62 includes two amplifiers to feed the dual fiber link shown in FIG. 3. One amplifier 63 is used to amplify signals in the forward path and another amplifier 65 is used to amplify signals in the reverse path. However, using dual amplifiers, as shown in the example of FIG. 5, is relatively expensive.

Optical amplifiers must have output isolators that provide isolation of the input for any noise from the optical transport fiber such as Rayleigh backscatter (RB), interferometric noise from optical connectors and fiber splice generated discrete reflections, and stimulated Brillouin scattering (SBS) noise. In addition, optical amplifiers may possibly require input isolators to provide isolation of the amplified spontaneous emission (ASE) noise and Rayleigh backscatter from the erbium fiber. However, placing optical isolators at the output and input of a basic optical amplifier will significantly attenuate optical signal beams traveling in the opposite direction. Therefore, a wide optical bandwidth (i.e., waveband) optical divider can be implemented at each end of the optical amplifier. The two oppositely propagating optical signal beams are divided into separate optical paths by an optical divider which has a common port and two signal ports where a low loss optical path is provided for one optical signal beam in one direction and a low loss optical path is provided for the other optical signal beam in the other direction while isolating the two signal ports from one another. This is an important feature for CATV systems where the forward path signal and the reverse path signal have different wavelengths, information bandwidth, signal power, modulation format, and technique. This allows an independent and transparent amplification of optical signal beams at different wavelengths, intensity levels and modulation depths within a single device.

The present invention provides a system for amplifying optical signals including a bi-directional optical amplifier with a single, dual, triple, or higher optical pump beams. The bi-directional optical amplifier can have one, two, or more amplification stages and provides suitable signal conditioning and amplification to both the forward path and reverse path optical signal beams.

Figure 6:
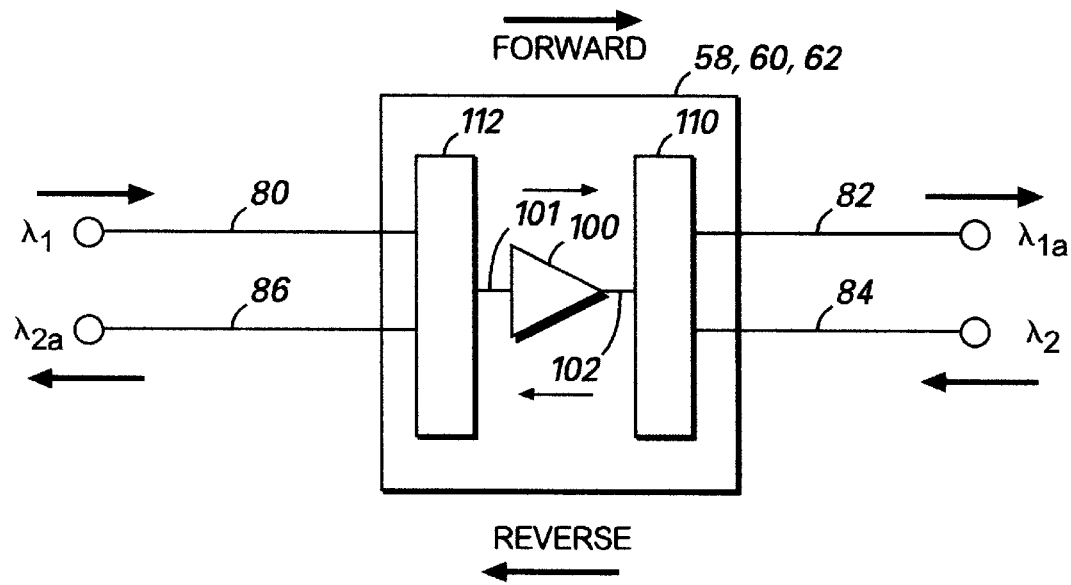
FIG. 6 is a schematic block diagram of a first implementation of an optical amplifier constructed in accordance with the present invention which is utilized for a headend interface amplifier, a regeneration amplifier, and a nodal interface amplifier in the optical communication link illustrated in FIG. 3.

In accordance with one embodiment of the present invention, a bi-directional four port optical amplifier, such as amplifiers 58, 60, and 62 of FIG. 3, is shown in FIG. 6. A first optical signal beam having a wavelength $\lambda_1$ is input to a forward direction signal port 80, amplified by amplifier 100, and output from a forward direction output port 82 as the amplified signal beam $\lambda_{1A}$. Similarly, a second optical signal beam having a wavelength $\lambda_2$ is input to a reverse direction signal port 84, amplified by amplifier 100, and output from a reverse direction output port 86 as the amplified signal $\lambda_{2A}$. Optical circulators 110 and 112, as will be described more fully below, route the first and second signals between the respective ports and the amplifier 100. A single, dual, triple or higher optical pump beams with one, two, or more optical erbium fiber amplification stages can be used to provide the amplification, although the forward and reverse signals can be quite different as will be explained more fully hereinafter. It should be understood that the signal identified as $\lambda_1$, as used herein, refers to the set of forward path optical signal beams $\lambda_{10}, \lambda_{11}, \lambda_{12}, \lambda_{13}, \lambda_{14}, \ldots, \lambda_{1M}$. It should also be understood that signal identified as $\lambda_2$, as used herein, refers to the set of reverse path optical signal beams $\lambda_{21}, \lambda_{22}, \lambda_{23}, \lambda_{24}, \ldots, \lambda_{2M}$.

Optical circulators 110 and 112 provide separate signal ports for each optical signal by coupling their respective second ports to the respective pass ports of the pump/signal WDM couplers 102 and 104 of amplifier 100. Each optical circulator provides a low loss input optical path from the first port to the second port and a low loss optical output path from the second port to the third port. This implementation provides a four port optical amplifier where a first optical signal propagating in one direction can be input to the first port of the first circulator, amplified, and output from the third port of the second circulator while a second optical signal propagating in the opposite direction can be input to the first port of the second circulator, amplified, and output from the third port of the first circulator.

Figure 7:
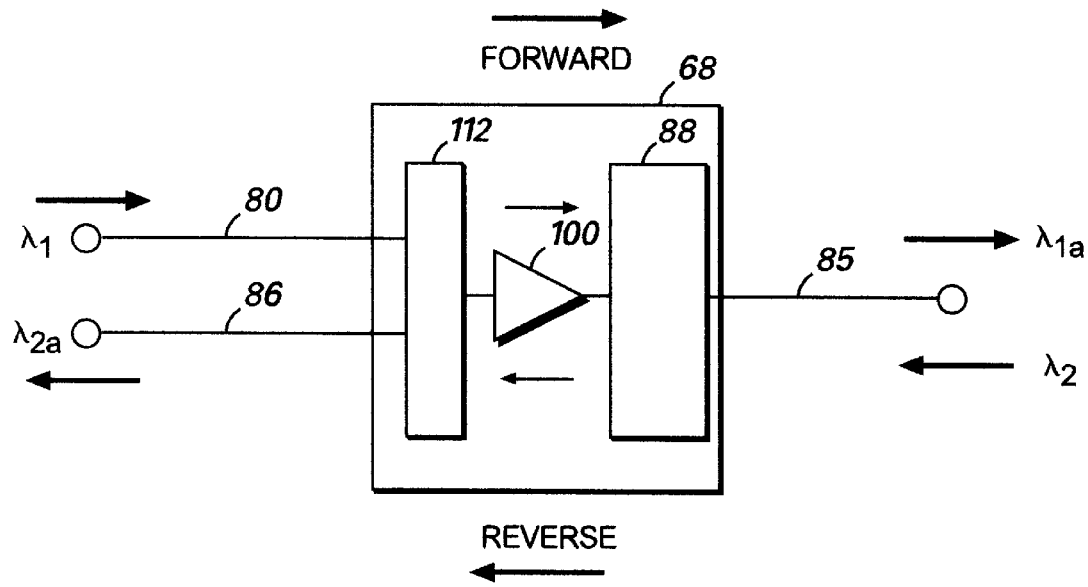
FIG. 7 is schematic block diagram of a second implementation of an optical amplifier constructed in accordance with the present invention which is utilized for a headend interface amplifier in the optical communication link illustrated in FIG. 4.
Figure 8:
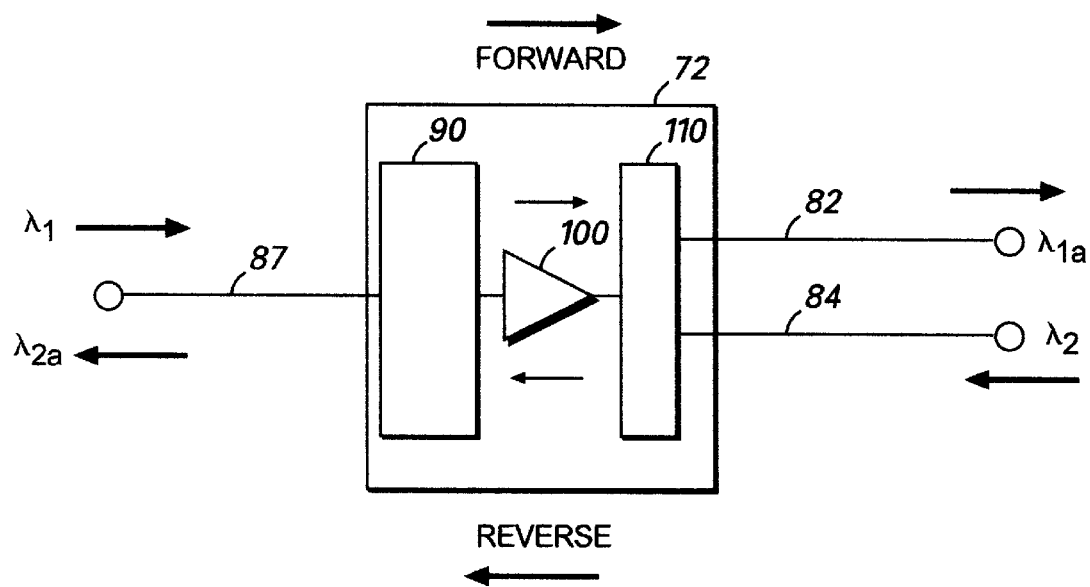
FIG. 8 is schematic block diagram of a third implementation of an optical amplifier constructed in accordance with the present invention which is utilized as a node interface amplifier in the optical communication link illustrated in FIG. 4.

In accordance with another embodiment of the present invention, a bi-directional three port optical amplifier, useful in implementing amplifiers 68 and 72 of FIG. 4, is shown in FIGS. 7 and 8, respectively. The four port amplifier of FIG. 6 can be changed into the three port device of headend amplifier 68 and node amplifier 72 by the addition of a bi-directional combiner on the respective side.

As shown in FIG. 7 with reference to headend amplifier 68, the optical combiner 88 is on the output side of amplifier 100. Optical circulator 112 routes optical signals between signal ports 80 and 86 and the amplifier 100. For headend amplifier 68, an optical signal having a wavelength $\lambda_1$ is input to a forward direction signal port 80, amplified by amplifier 100, and output from an input/output port 85 as the amplified signal $\lambda_{1A}$. Similarly, an optical signal having a wavelength $\lambda_2$ is input to the input/output port 85, amplified and output from a reverse direction output port 86 as the amplified signal $\lambda_{2A}$.

Node amplifier 72, as shown in FIG. 8, includes an optical combiner 90 on the input side of amplifier 72. Optical circulator 110 routes optical signals between signal ports 82 and 84 and the amplifier 100. For node amplifier 72, an optical signal having a wavelength $\lambda_1$ is input to an input/output port 87, amplified by amplifier 100, and output from forward direction output port 82 as the amplified signal $\lambda_{1A}$. Similarly, an optical signal having a wavelength $\lambda_2$ is input to the reverse direction input port 84, amplified and output from an input/output port 87 as the amplified signal $\lambda_{2A}$. It should be evident that, if the amplification stage gains in either direction are equivalent or they can be independently varied, only one version exists because the combined side may be reversed for use in either application. This is an advantage provided by the invention where an independently variable gain and modulation is provided for both forward and reverse path signals using only one physical gain stage.

Figure 9:
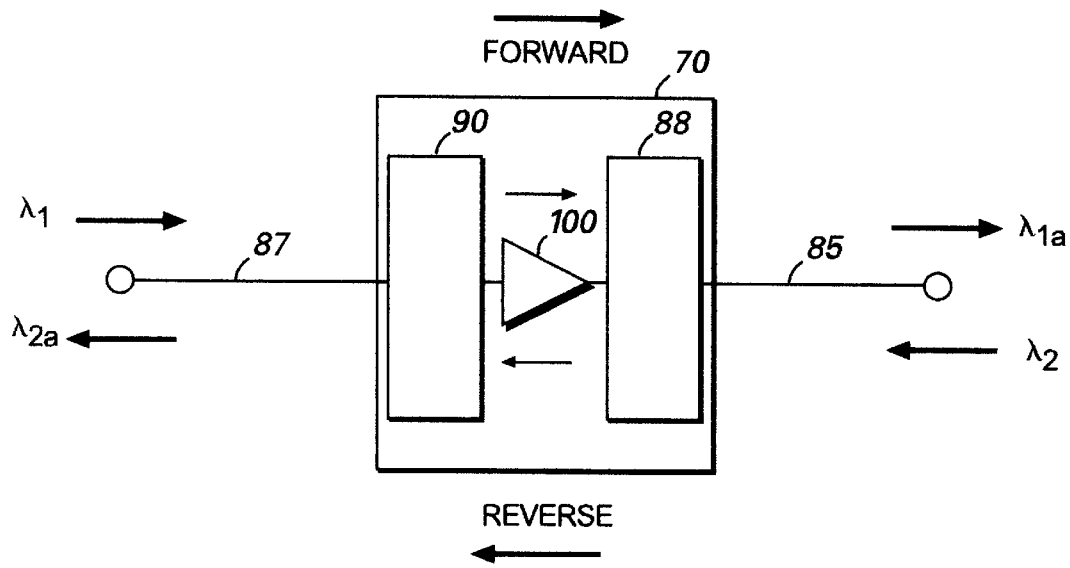
FIG. 9 is a schematic block diagram of a fourth implementation of an optical amplifier constructed in accordance with the present invention which is utilized as a regenerator amplifier in the optical communications link illustrated in FIG. 4.

In accordance with another embodiment of the present invention, a bi-directional two port optical amplifier, useful in implementing regeneration amplifier 70 of FIG. 4, is shown in FIG. 9. The four port amplifier of FIG. 5 can be changed into the two port device of amplifier 70 by the addition of combiner 88 on one side and combiner 90 on the other side. As shown in FIG. 9, an optical signal having a wavelength $\lambda_1$ is input to an input/output port 87 of regeneration amplifier 70. The signal is amplified by amplifier 100 and output from an input/output port 85 as amplified signal $\lambda_{1A}$. Similarly, an optical signal having a wavelength $\lambda_2$ is input to the input/output port 85, amplified by amplifier 100, and output from the input/output port 87 as amplified signal $\lambda_{2A}$.

Figure 10:
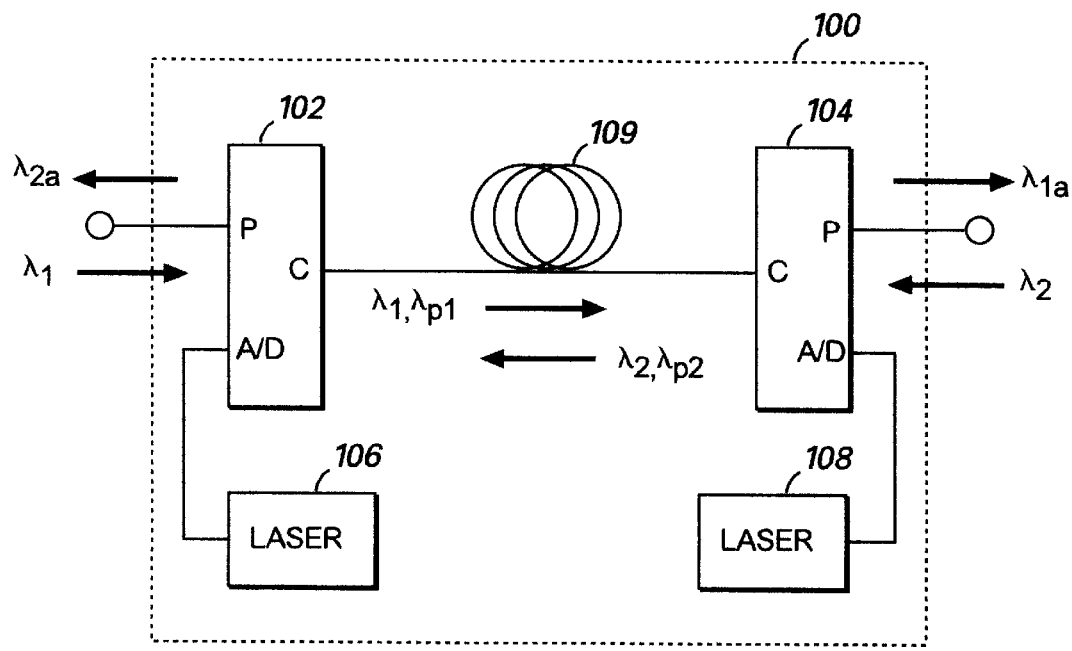
FIG. 10 is a detailed schematic diagram of the basic bi-directional optical amplifier.

FIGS. 10–14B will now be more fully discussed to describe the implementations of the versions of optical amplifiers disclosed in FIGS. 6–9. It will be understood that the optical amplifier 100 shown in FIG. 10 is utilized in amplifiers 58, 60, 62, 68, 70, and 72 shown in FIGS. 3–9.

As shown in FIG. 10, bi-directional optical amplifier 100 amplifies a first optical signal beam $\lambda_1$ propagating in a first direction through the amplifier to provide an amplified optical signal beam $\lambda_{1A}$ and amplifies a second optical signal $\lambda_2$ propagating in an opposite direction through the amplifier to provide an amplified optical signal $\lambda_{2A}$. The amplifier 100 includes two pump/signal WDM couplers 102 and 104, pump excitation light sources 106 and 108, and a length of optical fiber 109. The optical fiber 109 includes a rare earth element doping which can be pumped by an external excitation source, i.e., light, to form a population inversion and optical amplification. Preferably, the rare earth element is erbium which produces an optical fiber which can be pumped at several different wavelengths to provide the desired optical amplification.

Each pump/signal WDM coupler 102 and 104 is a 980/1550 nm or a 1480/1550 nm coupler that has a pass port P, an add port A/D, and a common port C. The optical erbium fiber 109 is optically coupled at one end to the common port C of the first pump/signal WDM coupler 102 and at the second end to the common port C the second pump/signal WDM couplers 104. Respective pump sources 106 and 108 are coupled to respective WDM couplers 102 and 104 at the add port. The respective pass ports of WDM couplers 102 and 104, are connected to input/output ports 101 and 103, respectively, of the amplifier. A low loss forward path for each optical signal is provided between the pass port and common port of each respective pump/signal WDM coupler. Thus, each WDM coupler combines a separate optical information signal beam $\lambda_1, \lambda_2$ with respective pump source energies $\lambda_{P1}$ and $\lambda_{P2}$ and launches the combination into the optical erbium fiber 109 from its respective end. This produces in the optical erbium fiber 109 a first optical information signal beam $\lambda_1$ propagating in one direction and a second optical information signal beam $\lambda_2$ propagating in the other direction, both information signal beams being amplified by respective pump source energies $\lambda_{P1}$ and $\lambda_{P2}$. Each pump/signal WDM couplers also provides isolation between the first and second optical signals.

Figure 11:
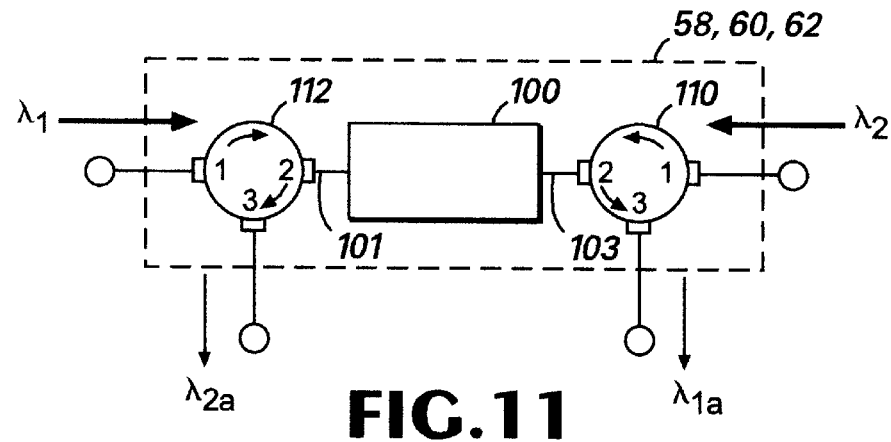
FIG. 11 is a detailed schematic diagram of the optical amplifier illustrated in FIG. 6.

FIG. 11 shows the amplifiers 58, 60, and 62 in greater detail. In accordance with the first embodiment of the present invention, optical circulators 110 and 112, each having a first, second, and third port, are connected on opposite sides of amplifier 100. The first port of circulator 112 inputs the first optical signal traveling in the forward path. The second port of circulator 112 is coupled to input/output port 101 of amplifier 100. The third port of circulator 112 outputs the amplified second signal traveling in the reverse path. Similarly, the first port of circulator 110 inputs the second optical signal traveling in the reverse path. The second port of circulator 110 is coupled to input/output port 103 of amplifier 100. The third port of circulator 110 outputs the amplified first signal traveling in the forward path.

Thus, the present invention as described with reference to FIG. 11 is advantageous for optical amplifiers of a dual fiber CATV system. For amplifiers 58, 60, and 62, the forward path fiber is connected to the first port of circulator 112 and the amplified forward path signal is output through the third port of circulator 110. Similarly, the reverse path fiber is connected to the first port of circulator 110 and the amplified reverse path signal is output through the third port of circulator 112.

Figure 12:
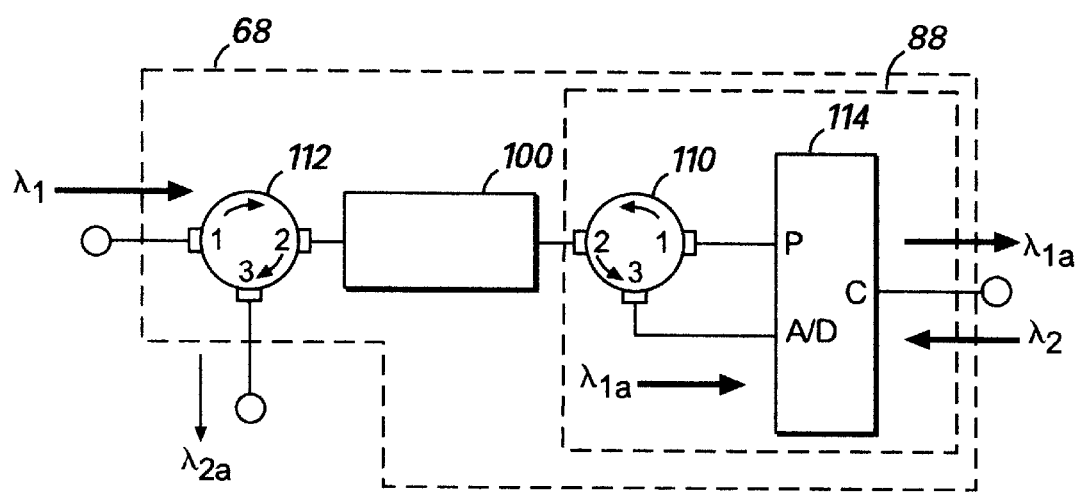
FIG. 12 is a detailed schematic diagram of the optical amplifier illustrated in FIG. 7.

FIG. 12 shows the headend amplifier 68 in greater detail in accordance with an embodiment of the present invention. As shown in FIG. 12, a signal/signal WDM coupler 114 having a pass port P, an add port A/D, and a common port C, is coupled to circulator 110. It will be understood that circulator 110 and WDM coupler 114 constitute the combiner 88 of headend amplifier 68, as shown in FIG. 7. The pass port of WDM coupler 114 is coupled to the first port of circulator 110 and the add port of WDM coupler 114 is coupled to the third port of circulator 110.

Figure 13:
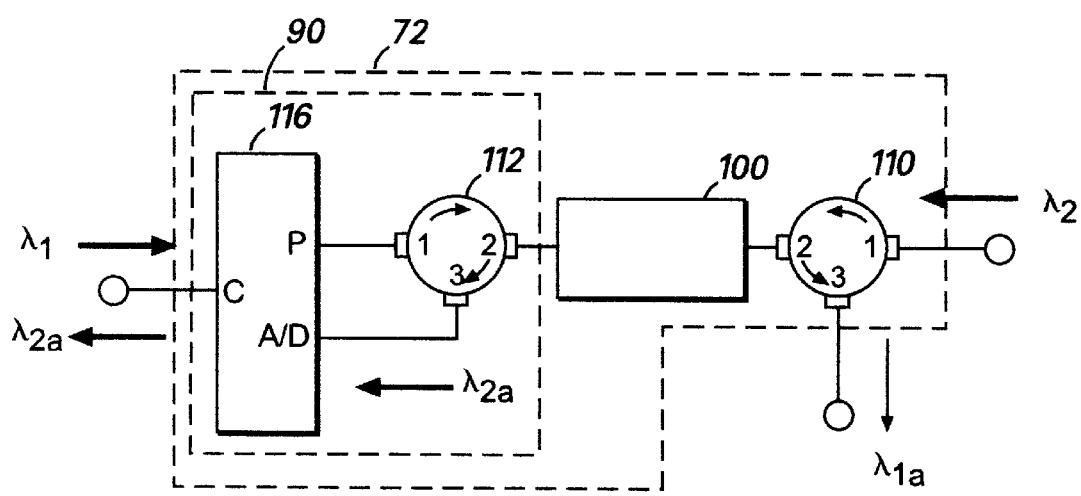
FIG. 13 is a detailed schematic diagram of the optical amplifier illustrated in FIG. 8.

FIG. 13 shows the node amplifier 72 in greater detail in accordance with another embodiment of the present invention. As shown in FIG. 13, a signal/signal WDM coupler 116 having a pass port P, an add port A/D, and a common port C, is coupled to circulator 112. It will be understood that circulator 112 and WDM coupler 116 constitute the combiner 90 of node amplifier 72, as shown in FIG. 8. The pass port of WDM coupler 116 is coupled to the first port of circulator 112 and the add port of WDM coupler 116 is coupled to the third port of circulator 112.

Thus, the present invention is advantageous for optical amplifiers of a single fiber CATV system. For a headend amplifier as shown in FIG. 12, one side of the amplifier has combined signals and the other side has separate signals. For example, at the headend, the fiber transmitter of the forward path is directly coupled to the amplifier by the signal input of the optical circulator 112 and the optical receiver of the reverse path is directly coupled to the signal output of the optical circulator 112. Conversely, on the other side of the amplifier, the ports of optical circulator 110 are coupled to WDM coupler 114 so that the input signal $\lambda_2$ and output signal $\lambda_{1A}$ can be transmitted on a single optical fiber. At a fiber node, the equipment is reversed, as shown in FIG. 13. The single optical fiber is coupled to the network side of the amplifier by WDM coupler 116 and the fiber receiver of the node for the forward path is directly coupled to the output signal port, i.e., port 3, of the optical circulator 110. Similarly, the optical transmitter for the reverse path is coupled directly to the signal input port, port 1, of the optical circulator 110.

It should be understood that an additional optical circulator can be used instead of each signal/signal WDM coupler, e.g., WDM couplers 114 and 116 shown in FIGS. 12 and 13. For example, another circulator having three ports can be connected to circulator 110 such that the third port of the additional circulator is connected to the first port of circulator 110 and the first port of the additional circulator is connected to the third port of circulator 110. The second port of the additional circulator is used to input and output signals from the fiber optic communications link. The use of an additional circulator in this manner allows a forward path signal and a reverse path signal to travel in opposite directions on the same fiber optic cable.

FIG. 14A shows one implementation of the regeneration amplifier 70 in greater detail in accordance with another embodiment of the present invention. As shown in FIG. 14A, two signal/signal WDM couplers 114 and 116, each having a pass port P, an add port A/D, and a common port C, are coupled to circulators 110 and 112, respectively. It will be understood that circulator 110 and WDM coupler 114 constitute combiner 88 and circulator 112 and WDM coupler 116 constitute combiner 90 of the node amplifier 72, as shown in FIG. 9. The ports of the circulators and WDM couplers are connected as described above.

FIG. 14B shows a second implementation of the regeneration amplifier. As shown in FIG. 14B, optical circulator 118 is coupled to optical circulator 110 and circulator 120 is coupled to circulator 112. It will be understood that circulators 110 and 118 constitute combiner 88 and circulators 112 and 120 constitute combiner 90 of the node amplifier 72, as shown in FIG. 9. The first port of circulator 120 is connected to the third port of circulator 112. The third port of circulator 120 is connected to the first port of circulator 112. The second port of circulator 120 inputs a first signal traveling on the forward path and outputs an amplified second signal traveling on the reverse path. Circulator 118 is coupled to circulator 110 in a similar manner.

It should be understood that the present invention is not limited to the amplification of only one signal in each direction. Additional signals can be added by a multiplexer either at the node and/or at the headend and can be amplified in accordance with the present invention. Therefore, although the description of the present invention herein describes the present invention with reference to a single forward path signal and a single reverse path signal, the present invention is not limited to the transmission of these two optical signals.

Figure 15:
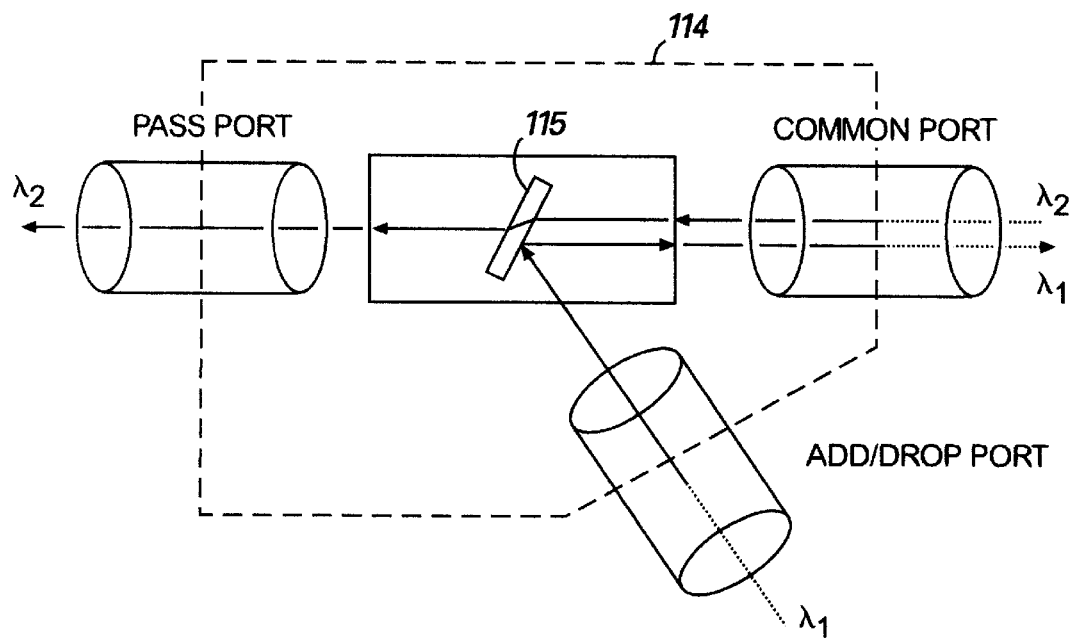
FIG. 15 is a diagram of an wavelength division multiplexing (WDM) coupler utilized in the optical amplifiers illustrated in FIGS. 11–14B.

The operation of each WDM coupler, as used in the present invention, is described as follows with reference to FIG. 15. Each WDM coupler, for example, WDM coupler 114, is a filter type WDM coupler that includes a lens filter 115 and a GRIN lenses (not shown). The lens filter 115 is coated with a material that reflects optical signal beams at certain wavelengths and passes optical signals at certain other wavelengths. Optical signals at wavelengths $\lambda_1$ and $\lambda_2$ can propagate in the same or opposite directions along the fiber connected to the common port of the WDM coupler. The optical signal beam at wavelength $\lambda_1$ is reflected at the interface of the lens filter and focused out of the fiber at the common port. The optical signal beam at wavelength $\lambda_2$ passes through the lens filter and is focused into the fiber at the pass port.

Figure 16:
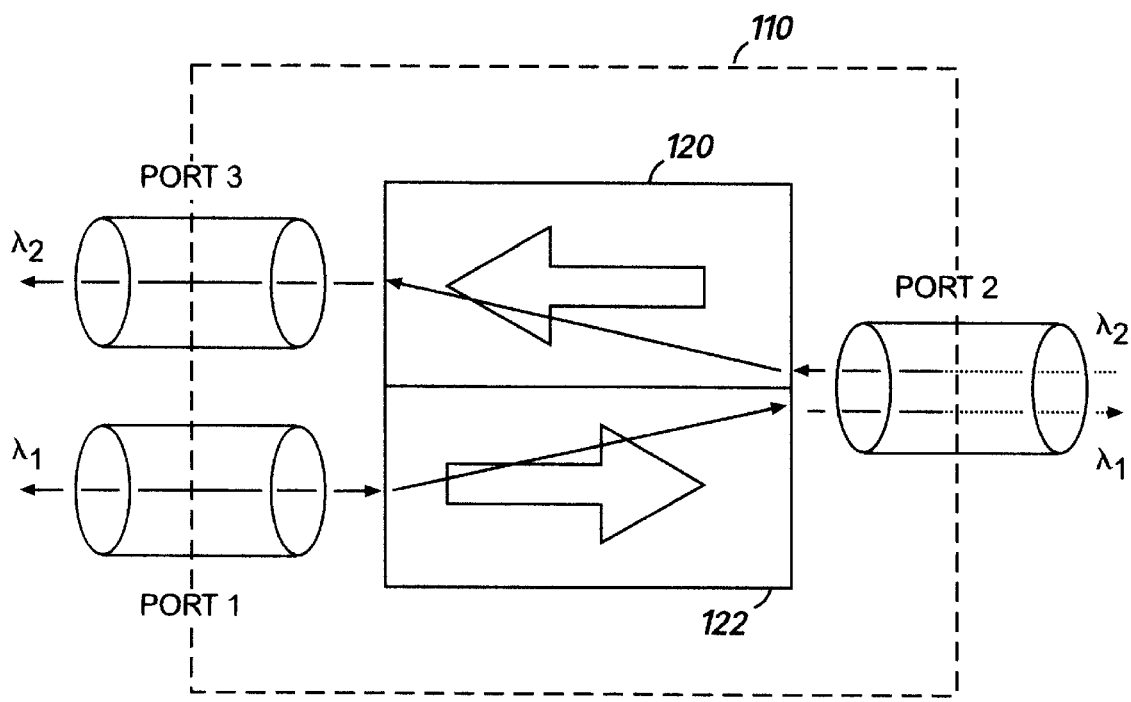
FIG. 16 is a diagram of an optical circulator utilized in the optical amplifiers illustrated in FIGS. 11–14B.

As discussed above, two optical signals are combined using a bi-directional combiner, preferably comprised of a signal/signal WDM coupler and an optical circulator. The operation of the optical circulator is generally described with reference to FIG. 16. Optical circulator 110 includes two bulk optic isolators 120 and 122 placed on top of each other. The bulk isolators pass oppositely propagating optical signal beams. Two or more oppositely propagating optical signal beams $\lambda_1$ and $\lambda_2$ are focused into a single-mode fiber connected to port 2 by a Graded Index (GRIN) lens at port 2 (not shown). Optical signal beam $\lambda_2$, which is focused into isolator 120 at port 2, passes through the isolator into the single-mode fiber at port 3. Similarly, optical signal beam at wavelength $\lambda_1$ is focused into isolator 122 at port 1, and is focused into the single-mode fiber at port 2. The isolation or rejection of optical beams from port 2 to port 1 and from port 3 to port 2 should be greater than 30 dB to maintain acceptable video performance. The circulator 110 has sufficiently wide bandwidth to pass optical signal beams propagating in opposite directions at several different wavelengths. The usable optical bandwidth for commercially available circulators and isolators is from 1530–1570 nm. The optical beams can be spaced at regular or irregular wavelength intervals.

While the invention has been described in connection with a preferred embodiment, this specification is not intended to limit the scope of the invention to the particular forms set forth, but, on the contrary, it is intended to cover any such alternatives, modifications, and equivalents as may be included within the spirit and scope of the invention as defined by the appended claims.

What is claimed is:

1. A system for amplifying optical signals of a communications system including modulated signals of CATV systems having a first path and a second path, including a bi-directional optical amplifier having a first port and a second port, and where said optical amplifier amplifies a first path signal input to its first port and outputs the amplified first path signal through its second port, and where said optical amplifier amplifies a second path signal input to its second port and outputs the amplified second path signal through its first port, said system comprising:

a first optical circulator having a first, second, and third port, said first optical circulator providing a low loss path from its first port to its second port and from its second port to its third port;

wherein the first path signal is input to the first port of said first optical circulator and output through the second port of said first optical circulator, wherein said second port of said first optical circulator is connected to the first port of said optical amplifier, and said third port of said first optical circulator outputs an amplified second path signal;

a second optical circulator having a first, second, and third port, said second optical circulator providing a low loss path from its first port to its second port and from its second port to its third port;

wherein a second path signal is input to the first port of said second optical circulator and output through the second port of said second optical circulator, wherein said second port of said second optical circulator is connected to the second port of said optical amplifier, and said third port of said second optical circulator outputs an amplified first path signal;

wherein said optical amplifier comprises:
   at least one stage of a rare earth doped optical fiber having a first end and a second end;
   a first pump/signal wavelength division multiplexing (WDM) coupler having a pass port, an add port, and a common port;
   a first pump light source for providing optical amplification of a first path signal traveling through the optical fiber in a first path;
   wherein the first end of said optical fiber is coupled to the common port of said first pump/signal WDM coupler, and wherein said first pump light source is coupled to the add port of said first pump/signal WDM coupler;
   wherein said pass port of said first pump/signal WDM coupler comprises the first port of said amplifier, such that said first pump/signal WDM coupler provides a combination of said first path signal and said first pump light source to the first end of said optical fiber;
   a second pump/signal wavelength division multiplexing (WDM) coupler having a pass port, an add port, and a common port;
   a second pump light source for providing optical amplification of a second path signal traveling through the optical fiber in a second path;
   wherein the second end of said optical fiber is coupled to the common port of said second pump/signal WDM coupler, and wherein said second pump light source is coupled to the add port of said second pump/signal WDM coupler;
   wherein said pass port of second first pump/signal WDM coupler comprises the second port of said amplifier, such that said second pump/signal WDM coupler provides a combination of said second path signal and said second pump light source to the second end of said optical fiber.

2. The system as set forth in claim 1 wherein said optical fiber is an erbium doped optical fiber.

3. A system for amplifying optical signals of a communications system including modulated signals of CATV systems having a first path and a second path, including a bi-directional optical amplifier having a first port and a second port, and where said optical amplifier amplifies a first path signal input to its first port and outputs the amplified first path signal through its second port, and where said optical amplifier amplifies a second path signal input to its second port and outputs the amplified second path signal through its first port, said system comprising:

a first optical circulator having a first, second, and third port, said first optical circulator providing a low loss path from its first port to its second port and from its second port to its third port;

wherein the first path signal is input to the first port of said first optical circulator and output through the second port of said first optical circulator, wherein said second port of said first optical circulator is connected to the first port of said optical amplifier, and said third port of said first optical circulator outputs an amplified second path signal;

a second optical circulator having a first, second, and third port, said second optical circulator providing a low loss path from its first port to its second port and from its second port to its third port;

wherein a second path signal is input to the first port of said second optical circulator and output through the second port of said second optical circulator, wherein said second port of said second optical circulator is connected to the second port of said optical amplifier, and said third port of said second optical circulator outputs an amplified first path signal;

a third optical circulator having a first, second, and third port, said third optical circulator providing a respective low loss path from its first port to its second port and from its second port to its third port;

wherein the first port of said first optical circulator is connected to the third port of said third optical circulator, and the third port of said first optical circulator is connected to the first port of said third optical circulator; and wherein the second port of said third optical circulator inputs the first path signal and outputs an amplified second path signal.

4. The system as set forth in claim 3 further comprising:

a first signal/signal wavelength division multiplexing (WDM) coupler having a pass port, an add port, and a common port;

wherein the first port of said second optical circulator is connected to the pass port of said first signal/signal WDM coupler, and said third port of said second optical circulator is connected to the add port of said first signal/signal WDM coupler;

wherein the common port of said first signal/signal WDM coupler outputs an amplified first path signal and inputs a second path signal.

5. The system as set forth in claim 3 further comprising:

a fourth optical circulator having a first, second, and third port, said fourth optical circulator providing a respective low loss path from its first port to its second port and from its second port to its third port;

wherein the first port of said second optical circulator is connected to the third port of said fourth optical circulator, and the third port of said second optical circulator is connected to the first port of said fourth optical circulator; and wherein the second port of said fourth optical circulator inputs the second path signal and outputs an amplified first path signal.

6. The system as set forth in claim 5 wherein said first path is a forward path and said second path is a reverse path, and wherein said first optical signal is modulated by the forward path signal of a CATV system and the second optical signal is modulated by the reverse path signal of the CATV system.

7. The system as set forth in claim 6 wherein:

said forward path signal comprises a plurality of FDM RF signals each having a respective channel carrier within the frequency range of approximately 50 MHz to 1000 MHz on a plurality of optical carrier beams having different wavelengths; and said reverse path signal comprises a plurality of FDM RF signals each having a respective channel carrier within the frequency range of approximately 5 MHz to 50 MHz on a plurality of optical carrier beams having different wavelengths.

8. The system as set forth in claim 5 wherein said optical amplifier comprises:

at least one stage of a rare earth doped optical fiber having a first end and a second end;

a first pump/signal wavelength division multiplexing (WDM) coupler having a pass port, an add port, and a common port;

a first pump light source for providing optical amplification of a first path signal traveling through the optical fiber in a first path;

wherein the first end of said optical fiber is coupled to the common port of said first pump/signal WDM coupler, and wherein said first pump light source is coupled to the add port of said first pump/signal WDM coupler;

wherein said pass port of said first pump/signal WDM coupler comprises the first port of said amplifier, such that said first pump/signal WDM coupler provides a combination of said first path signal and said first pump light source to the first end of said optical fiber;

a second pump/signal wavelength division multiplexing (WDM) coupler having a pass port, an add port, and a common port;

a second pump light source for providing optical amplification of a second path signal traveling through the optical fiber in a second path;

wherein the second end of said optical fiber is coupled to the common port of said second pump/signal WDM coupler, and wherein said second pump light source is coupled to the add port of said second pump/signal WDM coupler;

wherein said pass port of second first pump/signal WDM coupler comprises the second port of said amplifier, such that said second pump/signal WDM coupler provides a combination of said second path signal and said second pump light source to the second end of said optical fiber.

9. The system as set forth in claim 8 wherein said optical fiber is an erbium doped optical fiber.

10. A system for amplifying optical signals of a communications system including modulated signals of CATV systems having a first path and a second path, including a bi-directional optical amplifier having a first port and a second port, and where said optical amplifier amplifies a first path signal input to its first port and outputs the amplified first path signal through its second port, and where said optical amplifier amplifies a second path signal input to its second port and outputs the amplified second path signal through its first port, said system comprising:

a first optical circulator having a first, second, and third port, said first optical circulator providing a low loss path from its first port to its second port and from its second port to its third port;

wherein the first path signal is input to the first port of said first optical circulator and output through the second port of said first optical circulator, wherein said second port of said first optical circulator is connected to the first port of said optical amplifier, and said third port of said first optical circulator outputs an amplified second path signal;

a second optical circulator having a first, second, and third port, said second optical circulator providing a low loss path from its first port to its second port and from its second port to its third port;

wherein a second path signal is input to the first port of said second optical circulator and output through the second port of said second optical circulator, wherein said second port of said second optical circulator is connected to the second port of said optical amplifier, and said third port of said second optical circulator outputs an amplified first path signal;

a first signal/signal wavelength division multiplexing (WDM) coupler having a pass port, an add port, and a common port;

wherein the first port of said first optical circulator is connected to the pass port of said first signal/signal WDM coupler, and the third port of said first optical circulator is connected to the add port of said first signal/signal WDM coupler;

wherein the common port of said first signal/signal WDM coupler outputs an amplified second path signal and inputs a first path signal.

11. The system as set forth in claim 10 wherein said first path is a forward path and said second path is a reverse path, and wherein said first optical signal is modulated by the forward path signal of a CATV system and the second optical signal is modulated by the reverse path signal of the CATV system.

12. The system as set forth in claim 11 wherein:

said forward path signal comprises a plurality of FDM RF signals each having a respective channel carrier within the frequency range of approximately 50 MHz to 1000 MHz on a plurality of optical carrier beams having different wavelengths; and said reverse path signal comprises a plurality of FDM RF signals each having a respective channel carrier within the frequency range of approximately 5 MHz to 50 MHz on a plurality of optical carrier beams having different wavelengths.

13. The system as set forth in claim 10 wherein said optical amplifier comprises:

at least one stage of a rare earth doped optical fiber having a first end and a second end;

a first pump/signal wavelength division multiplexing (WDM) coupler having a pass port, an add port, and a common port;

a first pump light source for providing optical amplification of a first path signal traveling through the optical fiber in a first path;

wherein the first end of said optical fiber is coupled to the common port of said first pump/signal WDM coupler, and wherein said first pump light source is coupled to the add port of said first pump/signal WDM coupler;

wherein said pass port of said first pump/signal WDM coupler comprises the first port of said amplifier, such that said first pump/signal WDM coupler provides a combination of said first path signal and said first pump light source to the first end of said optical fiber;

a second pump/signal wavelength division multiplexing (WDM) coupler having a pass port, an add port, and a common port;

a second pump light source for providing optical amplification of a second path signal traveling through the optical fiber in a second path;

wherein the second end of said optical fiber is coupled to the common port of said second pump/signal WDM coupler, and wherein said second pump light source is coupled to the add port of said second pump/signal WDM coupler;

wherein said pass port of second first pump/signal WDM coupler comprises the second port of said amplifier, such that said second pump/signal WDM coupler provides a combination of said second path signal and said second pump light source to the second end of said optical fiber.

14. The system as set forth in claim 13 wherein said optical fiber is an erbium doped optical fiber.

15. The system as set forth in claim 10 further comprising:

a second signal/signal wavelength division multiplexing (WDM) coupler having a pass port, an add port, and a common port;

wherein the first port of said second optical circulator is connected to the pass port of said second signal/signal WDM coupler, and said third port of said second optical circulator is connected to the add port of said second signal/signal WDM coupler;

wherein the common port of said second signal/signal WDM coupler outputs an amplified first path signal and inputs a second path signal.

16. The system as set forth in claim 15 wherein said first path is a forward path and said second path is a reverse path, and wherein said first optical signal is modulated by the forward path signal of a CATV system and the second optical signal is modulated by the reverse path signal of the CATV system.

17. The system as set forth in claim 16 wherein:

said forward path signal comprises a plurality of FDM RF signals each having a respective channel carrier within the frequency range of approximately 50 MHz to 1000 MHz on a plurality of optical carrier beams having different wavelengths; and said reverse path signal comprises a plurality of FDM RF signals each having a respective channel carrier within the frequency range of approximately 5 MHz to 50 MHz on a plurality of optical carrier beams having different wavelengths.

18. The system as set forth in claim 15 wherein said optical amplifier comprises:

at least one stage of a rare earth doped optical fiber having a first end and a second end;

a first pump/signal wavelength division multiplexing (WDM) coupler having a pass port, an add port, and a common port;

a first pump light source for providing optical amplification of a first path signal traveling through the optical fiber in a first path;

wherein the first end of said optical fiber is coupled to the common port of said first pump/signal WDM coupler, and wherein said first pump light source is coupled to the add port of said first pump/signal WDM coupler;

wherein said pass port of said first pump/signal WDM coupler comprises the first port of said amplifier, such that said first pump/signal WDM coupler provides a combination of said first path signal and said first pump light source to the first end of said optical fiber;

a second pump/signal wavelength division multiplexing (WDM) coupler having a pass port, an add port, and a common port;

a second pump light source for providing optical amplification of a second path signal traveling through the optical fiber in a second path;

wherein the second end of said optical fiber is coupled to the common port of said second pump/signal WDM coupler, and wherein said second pump light source is coupled to the add port of said second pump/signal WDM coupler;

wherein said pass port of second first pump/signal WDM coupler comprises the second port of said amplifier, such that said second pump/signal WDM coupler provides a combination of said second path signal and said second pump light source to the second end of said optical fiber.

19. The system as set forth in claim 18 wherein said optical fiber is an erbium doped optical fiber.

* * * * *